United States Patent
Tanimoto et al.

(10) Patent No.: US 7,401,225 B2
(45) Date of Patent: Jul. 15, 2008

(54) METHOD AND APPARATUS FOR PUBLISHING SIGNATURE LOG ENTRY

(75) Inventors: Kouichi Tanimoto, Yokohama (JP); Kunihiko Miyazaki, Yokohama (JP); Shinji Itoh, Yokohama (JP); Yasuaki Kudo, Sakura (JP); Yoshiharu Bessho, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 879 days.

(21) Appl. No.: 10/628,388

(22) Filed: Jul. 29, 2003

(65) Prior Publication Data

US 2004/0172540 A1 Sep. 2, 2004

(30) Foreign Application Priority Data

Feb. 27, 2003 (JP) ............... 2003-050248

(51) Int. Cl.
*H04L 9/00* (2006.01)
(52) U.S. Cl. ............... 713/178
(58) Field of Classification Search ............... None
See application file for complete search history.

(56) References Cited

U.S. PATENT DOCUMENTS 5,872,638 A * 2/1999 Haze ............... 358/405
5,956,404 A 9/1999 Schneier et al.
2002/0023221 A1 * 2/2002 Miyazaki et al. ............ 713/178
2002/0101994 A1 8/2002 Shinzaki
2003/0182552 A1 9/2003 Tanimoto et al.

FOREIGN PATENT DOCUMENTS

| EP | 1094424 | 4/2001 |
|---|---|---|
| JP | 2001 331105 | 11/2001 |
| JP | A 2001 331104 | 11/2001 |
| JP | A 2002 175008 | 6/2002 |
| JP | 2002268544 | 9/2002 |
| JP | A 2002 335241 | 11/2002 |

* cited by examiner

*Primary Examiner*—Emmanuel L Moise
*Assistant Examiner*—David J Pearson
(74) *Attorney, Agent, or Firm*—Mattingly, Stanger, Malur & Brundidge, P.C.

(57) ABSTRACT

A publication system effective and secure to the publication agency and a user is provided for the publication agency, and a signature verifying function using the published signature log entries is provided for the user. The publication agency publishes a signature log entry received from the users on the Web, and acquires a time-stamp at the time of the publication, and transmits the time-stamp together with a publication notice back to the user. The publication agency also has the signature log, and either discloses part of the log at regular intervals in a newspaper or the like, or produces publication-purpose data based on the signature log entry received from each user, and publishes the data in the newspaper. The publication agency, after the newspaper publication, transmits the signature log of the publication agency to the user.

8 Claims, 12 Drawing Sheets

FIG.6A

SIGNATURE LOG FILE

| | 604 | 605 | 606 | 607 | 608 | 609 |
|---|---|---|---|---|---|---|
| | IDENTIFICATION NUMBER | SIGNATURE NUMBER | TYPE | HASH VALUE OF PREVIOUS SIGNATURE LOG ENTRY | HASH VALUE OF MESSAGE | SIGNATURE OR RECEIVED PUBLICATION SIGNATURE LOG ENTRY INFORMATION |
| 601 | Ver.1.0 | 1 | RECEPTION | $H(S_0)$ | — | $31 \| H(S_{31})$ |
| 602 | Ver.1.0 | 2 | TRANSMISSION | $H(S_1)$ | $H(M_2)$ | $Sign(2 \| H(S_1) \| H(M_2))$ |
| 603 | Ver.1.0 | 3 | RECEPTION | $H(S_2)$ | — | $15 \| H(S_{15})$ |

FIG.6B

USER INFORMATION FILE

| | 617 | 618 | 619 | 620 | 621 | 622 |
|---|---|---|---|---|---|---|
| | SIGNATURE NUMBER | TYPE | PARTNER INFORMATION | RECEIVED SIGNATURE NUMBER | PUBLICATION SIGNATURE LOG ENTRY | DATE AND TIME |
| 610 | 0 | NEWSPAPER PUBLICATION | NEWSPAPER | — | — | — |
| 611 | 1 | RECEPTION | USER A @XXX.co.jp | 32 | $S_{31}$ | 2002.10.17.0816 |
| 612 | 2 | TRANSMISSION | USER A @XXX.co.jp | — | — | — |
| 613 | 3 | RECEPTION | USER B @XXX.co.jp | 16 | $S_{15}$ | 2002.10.19.1550 |
| 614 | 4 | TRANSMISSION | USER B @XXX.co.jp | — | — | — |
| 615 | 5 | NEWSPAPER PUBLICATION | NEWSPAPER | — | $S_4$ | 2002.10.20 |
| 616 | 6 | LOG TRANSMISSION | USER A @XXX.co.jp | — | — | — |

US 7,401,225 B2

METHOD AND APPARATUS FOR PUBLISHING SIGNATURE LOG ENTRY

INCORPORATION BY REFERENCE

This application claims priority based on a Japanese patent application, No. 2003-050248 filed on Feb. 27, 2003, the entire contents of which are incorporated herein by reference.

BACKGROUND OF THE INVENTION

The present invention relates to a technique of enhancing the evidence of digital signature.

There is a technique for enhancing the evidence of digital signature (hereafter, called signature) in which when a signature is made, the signature log information up to that time is reflected, and the information about the generated signature is added to the signature log as a new signature log entry (for example, see patent documents JP-A-2001-331104 or JP-A-2001-331105). This method makes the generated signature have a chain structure. When the evidence is validated, chain verification is made in addition to signature verification, thus making the interpolation difficult.

In this method, the signatures with a continuous chain are decided allowable, but in order to definitely prove the correctness, the signature log is desired to include a reliable, proper signature log entry. In order to generate this reliable signature log entry in the above method, periodic publication of signature log entries is proposed as one of the countermeasures.

Each user who makes his or her signature by using the above method publishes the latest signature log entry at fixed intervals or at every constant times. If the signature log entry is published on an issue such as newspaper or gazette (hereafter, called the newspaper), the legal signatory can designate the unfair signature log entries produced by the other persons, so that it can be brought to light. Thus, the disclosed signature log entry can be treated as a proper signature log entry. In addition, since the disclosed signature log entry is made available to the public, it is difficult to cancel afterward or alter dishonestly.

In the above technique, when the number of users is large, it is realistically difficult for all users to publish their signature log entries in the newspaper. Therefore, a more practical scheme is desired.

SUMMARY OF THE INVENTION

The present invention provides a publication agency that acts for the disclosure of all signature log entries in the newspaper at a time with each user not individually publishing his or her log entry in the newspaper.

That is, the present invention provides a publication system that is effective and secure for the publication agency's side apparatus and user's side apparatus, and a signature validating function using the published signature log entries to the users.

In this invention, "signature log entry" is the information about the generation of the individual signature produced or received, and "signature log" is the file with a plurality of "signature log entries" stored.

In the publication system according to the invention, the user's side apparatus adds the produced signature to the signature log by using a signature technique (hereafter, called hysteresis signature) that reflects the information obtained from other signature log entries when the signature is formed. In addition, it transmits a publication letter of request affixed with the generated signature log entry to the publication agency, requesting it for the disclosure.

The publication agency's apparatus receives user's signature log entry (hereafter, referred to as publication signature log entry) affixed to the written application from each user' side apparatus, and discloses them on Web so that the third person can access. Therefore, since the signature log entry of each user can be enhanced in the credibility equivalently to the disclosure in the newspaper, reliable points can be produced within its own signature log. In addition, since each user can acquire the published signature log entries at any time and in any place soever. The obtained signature log entries are used for starting points of chain verification as proper signature log entries.

Moreover, when the publication agency's side apparatus publishes, the publication signature log entry sent from each user, on the Web or the like that the publication agency manages, it sends out a Web publication notice with signature to each user. Thus, the user can knows that his or her publication signature log entry has been certainly disclosed by the publication agency. If the normal user not requested for the publication receives the Web publication notice, the unfair publication by other persons can be found out.

In addition, the publication agency's side apparatus may acquire a time-stamp at the time of disclosure, and affix this time-stamp to the Web publication notice. This time-stamp enables the Web publication notice received user to confirm the publication date and time. Moreover, if the signature of the publication agency is attached to the Web publication notice with the time-stamp affixed, the notice can give an assurance to the contents of the signature log entry and the publication date and time, and use of this Web publication notice information will enable the user to form the signature log entry with definite date and time within the signature log. In other words, the signature formed before (after) the signature log entry can be proved to be formed before (after) the date and time written on the Web publication notice.

The publication agency itself has the signature log of the publication agency. When the publication agency's side apparatus receives a publication letter of request affixed with the publication signature log entry from the user's side apparatus, it validates the signature, and generates the signature log entry of the publication agency including the received publication signature log entry, and updates the signature log of the publication agency. In addition, the publication agency' side apparatus, when transmitting the Web publication notice to the user's side apparatus, forms the signature, and updates the signature log of the publication agency. Since the publication agency's side apparatus adds the signature log entries including the publication signature log entry received from each user's side apparatus to the signature log of the publication agency, the garbled publication signature log entry after the disclosure can be detected if the publication agency or user examines the chain of the signature log of the publication agency. Also, the publication agency's side apparatus, when receiving the publication signature log entry from the user's side apparatus or transmitting the Web publication notice to the user, updates the user information file (the file with user information stored) together with the signature log. The user information file is referred to to decide the destination and the range of the signature log to be sent when the Web publication notice or signature log is transmitted.

Moreover, the publication agency's side apparatus transmits, to the user who sent the publication signature log entry to the publication agency, the signature log of the publication agency produced in the interval from when it received the publication signature log entry from the user to when it there-after first published in the newspaper. Therefore, the user's side apparatus, when making signature verification (including chain verification), can use this transmitted signature log to validate the signature by tracking the chain of the signature log of the publication agency from the signature log entry that the publication agency published in the newspaper.

In addition, the publication agency's side apparatus discloses the signature log entries of the signature log of the publication agency in the newspaper at a proper time or at periodic intervals (for example, once a week). Also, the publication agency's side apparatus may use the publication signature log entry sent from each user's side apparatus to form data for publication in the newspaper, and to disclose it. By using the published signature log entry or data for publication in the newspaper to make signature verification, it is possible to guarantee the justice of the signature log of the publication agency and to approve the fairness of the publication agency itself.

According to the invention, since the publication agency acts for publishing the signature log entry of the user's side apparatus, more users can prove the fairness of their own signature.

More users can verify the justice of his own signature by the scheme that the publication agency acts for publishing the signature log entries of the user's side apparatus, according to the invention.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 6 exemplifies a diagram showing the structure of data stored in the signature log file, and the structure of data stored in the user information file, respectively.

DETAILED DESCRIPTION OF THE EMBODIMENTS

Figure 1:
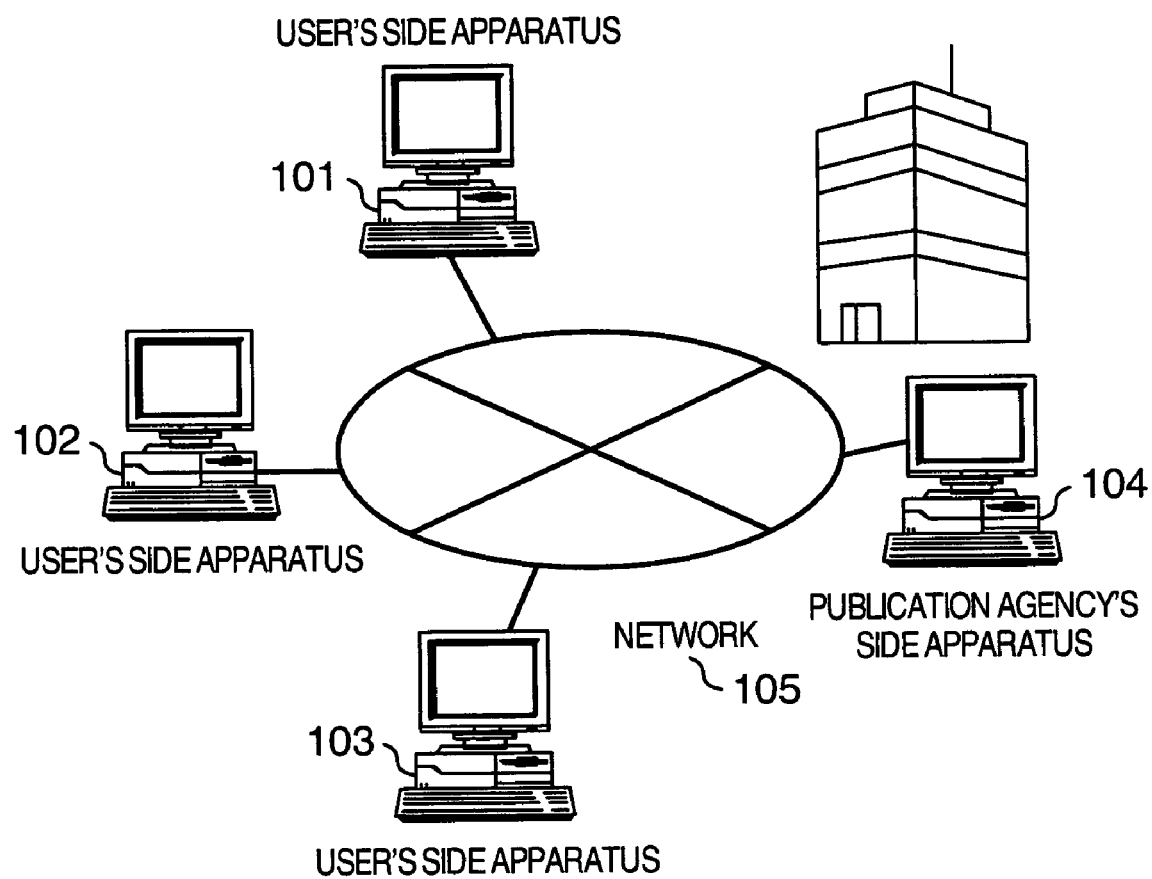
FIG. 1 exemplifies a schematic diagram of a system to which the first embodiment of the invention is applied.

FIG. 1 is a schematic diagram showing the publication system in one embodiment of the invention.

As illustrated, this publication system includes user's side apparatus 101~103 that request for the publication agency to publish the signature log entry and to verify the signature by use of the signature log received from the publication agency, and a publication agency's side apparatus 104 that discloses the signature log entry sent from each user and the signature log entry of itself or the signature log for approving the fairness, and transmits the signature log necessary for the signature verification to each user. The user's side apparatus 101~103 and the publication agency's side apparatus 104 are connected through a network 105.

Figure 2:
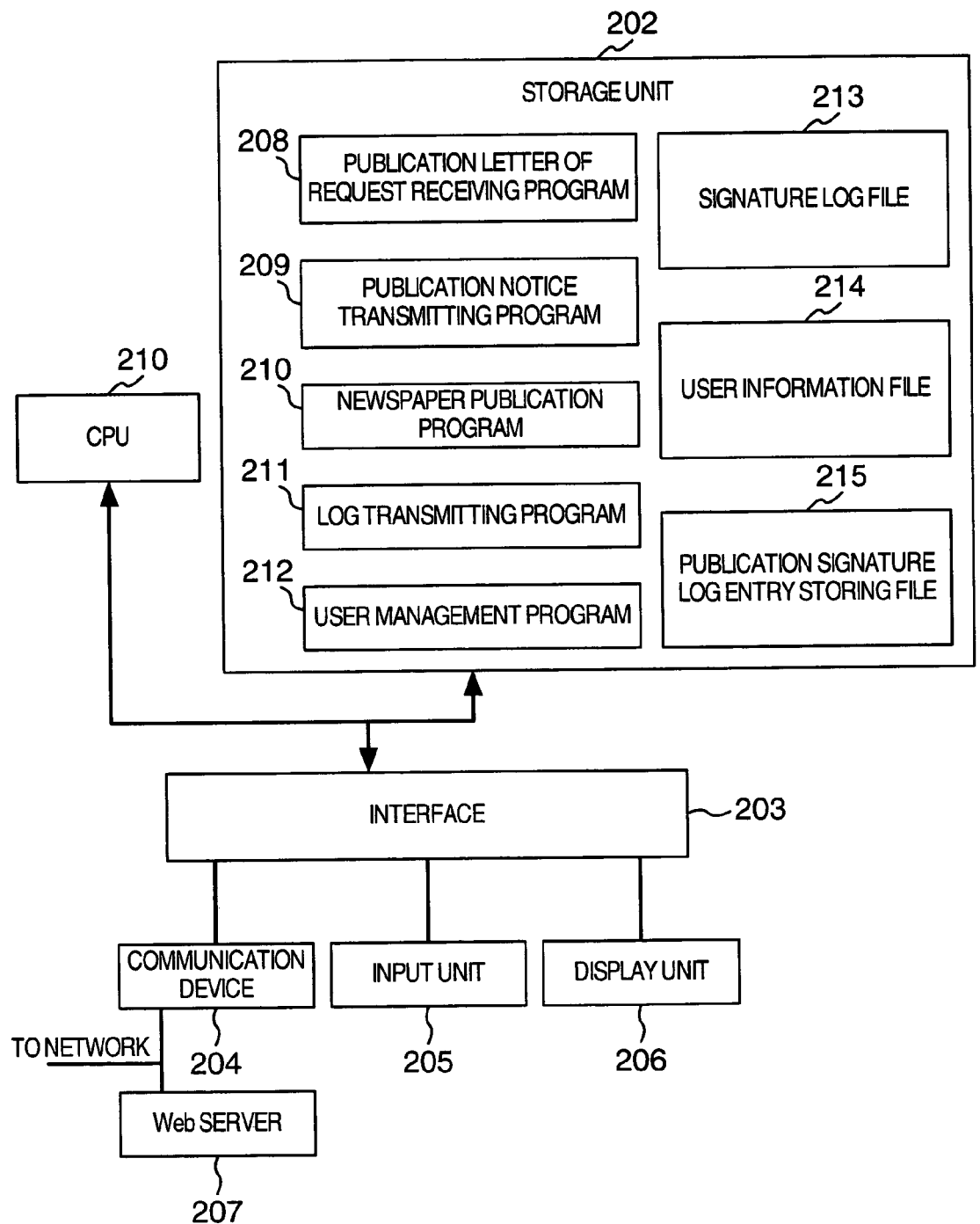
FIG. 2 exemplifies a block diagram of the publication agency's side apparatus in this publication system.

The publication agency's side apparatus 104, as shown in FIG. 2, can be formed of a storage unit 202, a communication device 204 for communicating through the network with other apparatus, a Web server 207 connected to the communication device 204, an input unit 205 such as keyboard and mouse, a display unit 206 such as display, and a CPU 201.

The storage unit 202 has stored therein programs (a publication letter of request receiving program 208, a publication notice transmitting program 209, a newspaper publication program 210, a log transmitting program 211 and a user management program 212) for actualizing the functions of the publication system, a signature log file (also called signature log) 213, a user information file 214, and a published signature log entry storing file 215 that has recorded therein the signature log entry received from each user. The programs 208~212 are executed by the CPU 201 to realize, on the publication agency's side apparatus, the functions for the signature formation and verification, the storing and on-Web publication of the signature log entry received from the user, the newspaper publication of the signature log entry of the publication agency itself, the reading-in and updating of the signature log of the publication agency, and the reading-in and updating of the user information file of the publication agency.

Each of the programs may be previously stored in the storage unit 202 or introduced through a medium that can be used on the publication agency's side apparatus. The medium includes, for example, a storage medium that can be put on and taken off the publication agency's side apparatus or a communication medium such as a network that can be connected to the communication device 204 or a carrier wave propagated on the network.

Figure 3:
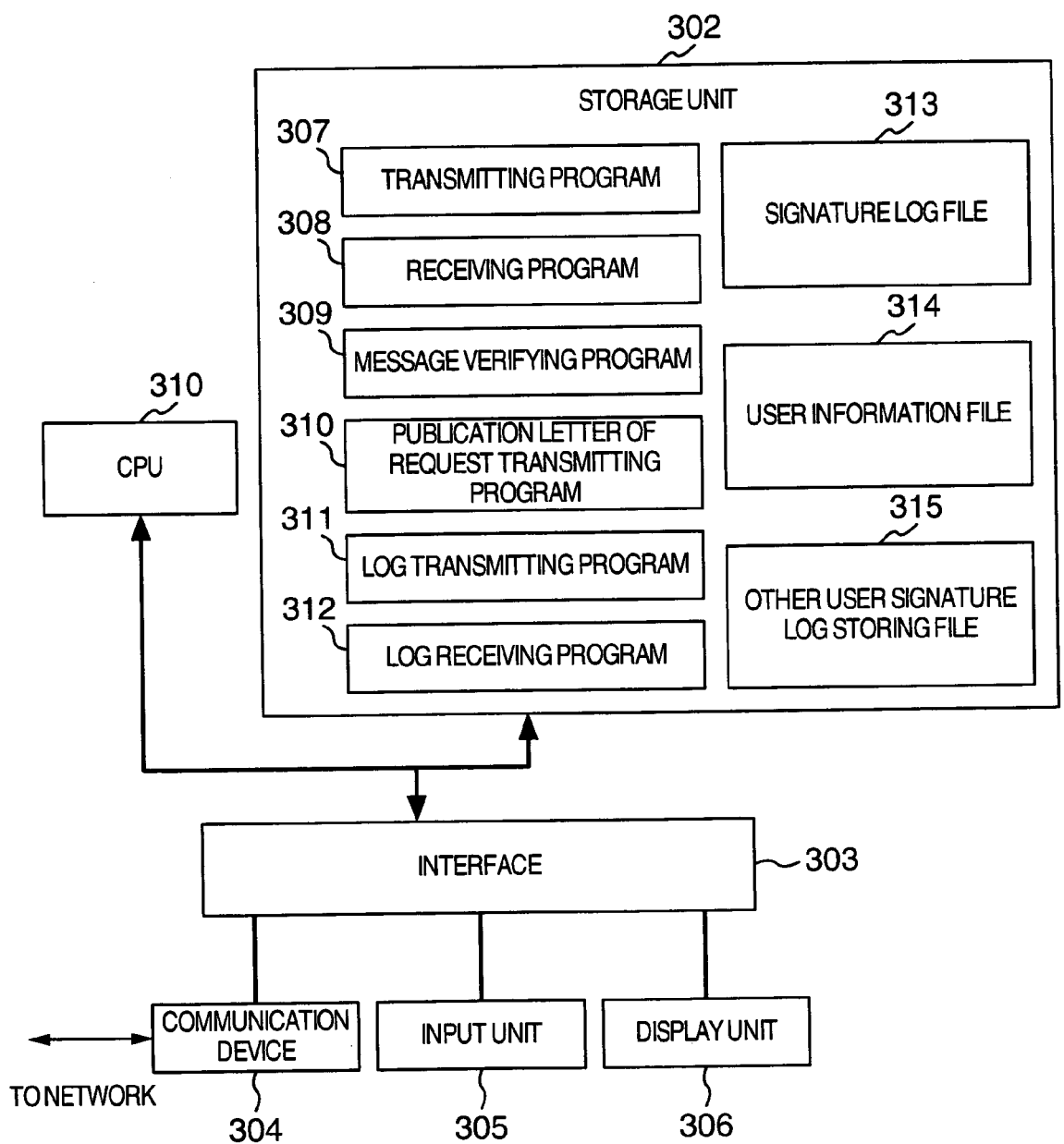
FIG. 3 exemplifies a block diagram of the user's side apparatus in this publication system.

The user's side apparatus, as shown in FIG. 3, is formed of a storage unit 302, a communication device 304 for communicating through a network with other apparatus, an input unit 305 such as keyboard and mouse, a display unit 306 such as display, and a CPU 301.

The storage unit 302 has stored therein a transmission program 307 for making a signature and transmitting a message with signature, a receiving program 308 for receiving the message with signature and verifying the signature, a message verifying program 309 for conducting verification including the chain verification of the signature log, a publication letter of request transmitting program 310 for generating the publication letter of request and transmitting the publication signature log entry to the publication agency, a log transmitting program 311 for transmitting its own signature log to other user, a log receiving program 312 for receiving the signature log of other user from other user, a signature log file (called signature log) 313, a user information file 314, and a file 315 for storing the signature log received from other user. The programs 307~312 are executed by the CPU 301 to realize, on the user's side apparatus, the functions for the signature formation and verification, the reading-in and updating of the signature log, and the reading-in and updating of the user information file.

The user's side apparatus 101~103 use a hysteresis signature technique for reflecting signature log information at the time of signature formation.

Figure 4:
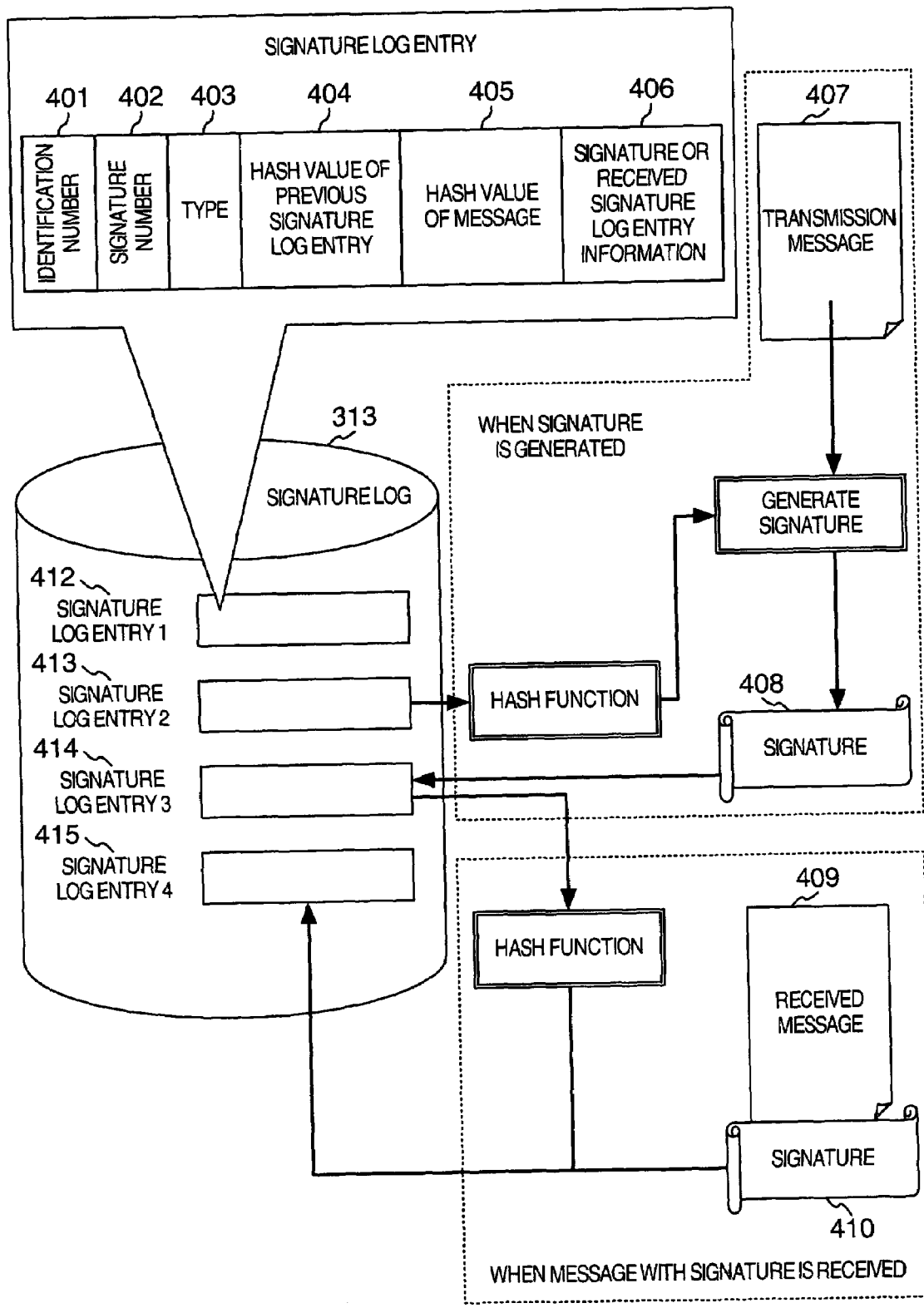
FIG. 4 exemplifies a schematic diagram showing the hysteresis signature technique.

FIG. 4 shows the situations in which the signature log is managed according to the hysteresis signature technique when the user's side apparatus 101~103 forms a signature on a transmission message 407, and when it receives a received message 409 with signature and verifies the signature.

At the time of signature formation, a private key is acted on the transmission message 407 and the hash value of a previous signature log entry 413 to form a signature 408. After the signature formation, a signature log entry 414 is produced by use of the previous signature log entry 413 and the formed signature 408, and added to the signature log 313. In order to know the matching relation between signature and signature log entry, the signature number of the signature log entry to be newly added this time to the signature log is added to the formed signature at the time of signature formation. The signature log 313 is the file in which the produced signature log entries are stored in turn.

At the time of signature reception, a signature 410 affixed to the reception message 409 is verified by use of a public key. After the verification, a signature log entry 415 is produced by use of the hash value of the previous signature log entry 414 and the signature 410, and added to the signature log 411. Thus, the signature log entry with signature information recorded is produced at the time of signature formation and signature reception. Since the previous signature information is used for the next signature formation, a chain relation is produced between the signatures. In addition to the normal signature verification using the public key, the verification of this chain relation will lead to more accurate signature verification.

The signature log entry 412~415 in the user's side apparatus 101~103 has a "identification number 401" indicating information of signature algorithm or the like, a "signature number 402" indicating the order of signature log entry, a "type 403" indicating that the signature log entry is produced either at the time of signature formation (transmission) or at the time of signature verification (reception), a "previous signature log entry hash value 404" useful for the chain verification, a "signature-attached message hash value (called hash value of message) 405" recorded only at the time of signature formation, and a "signature or received signature log entry information 406" (at the time of signature formation it corresponds to the formed signature or at the time of signature verification it is the combination of the signature number of the received signature and the hash value of the signature log entry corresponding to that signature).

Figure 5:
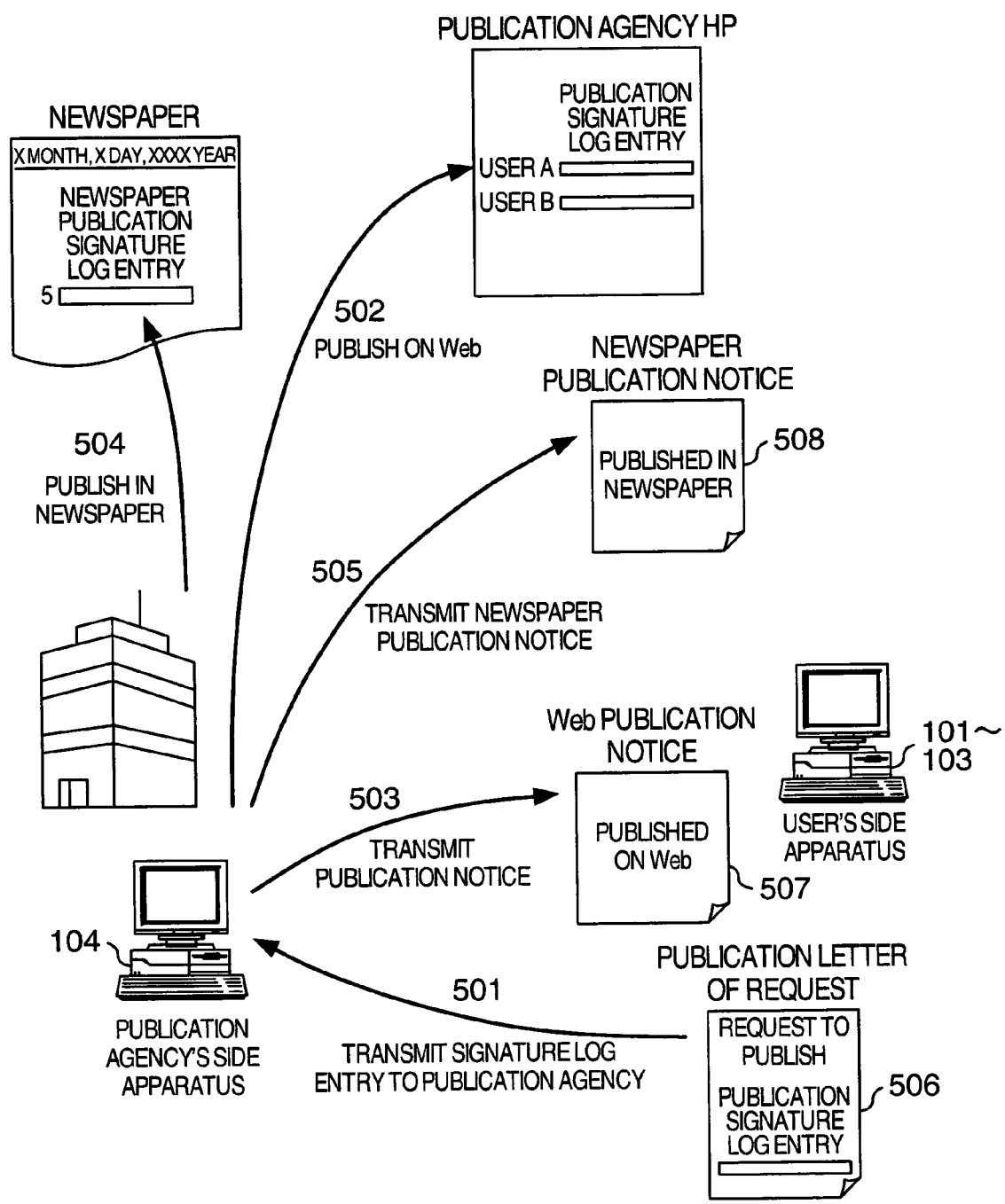
FIG. 5 exemplifies a diagram showing information transmitted and received between the user and the publication agency.

FIG. 5 shows the flow of data transmitted and received between the user and the publication agency.

The user's side apparatus 101~103 transmits, at an appropriate time or at fixed intervals to the publication agency's side apparatus 104, a public letter of request 506 with a desired-to-open signature log entry (for example, the latest signal log entry at that time) affixed (501). Thus, the user can produce the reliability-proved signature log entry within the signature log 313. The signature log entry transmitted to the publication agency is called the publication signature log entry.

The publication agency's side apparatus that has received the publication signature log entry from the user's side apparatus 101~103 stores the publication signature log entry in its storage unit 202, and publishes it by use of Web or the like (502). After the publication, the publication agency's side apparatus transmits a Web publication notice 507 to the user who has produced the publication signature log entry to notify the user of having disclosed (503).

The publication agency publishes its own signature log in the newspaper at an appropriate time or at fixed intervals (the disclosed signature log entry is hereafter called the newspaper publication signature log entry) (504). During the time interval from the previous newspaper publication time to this newspaper publication time after the publication in the newspaper, the publication agency's side apparatus transmits a newspaper publication notice 508 to the user who requested to open the publication signature log entry disclosed in step 502 to notify the user of having disclosed in the newspaper (505). The newspaper publication notice is accompanied by information useful for the user to verify the signature by use of the newspaper publication signature log entry.

In this embodiment, the publication agency's side apparatus 104 also utilizes the above hysteresis signature technique that reflects the signature log information at the time of signature formation. FIGS. 6A and 6B show examples of the structures of the signature log 213 and user information file 214 provided to realize the functions of the publication system on the publication agency's side apparatus 104, respectively.

The signature log file 213 of the publication agency's side apparatus 104 is the file in which the signature log entries produced on the publication agency's side apparatus are recorded in order. In FIG. 6A, each of records 601~603 has an identification number 604, a signature number 605, a type 606, a hash value 607 of the previous signature log entry, a hash value 608 (called message hash value) of a message to which a signature is affixed on the publication agency's side apparatus, and a signature or received publication signature log entry information 609 (at the time of signature formation, it is the formed signature, and at the time of signature verification, it is the combination of the signature number of the received publication signature log entry and the hash value of the publication signature log entry).

The "identification number 604" is the number indicating the information such as signature algorithm used by the publication agency's side apparatus 104. This number is useful to know what type of cipher or hash function is employed when the signature log entry 601~603 is produced.

The "signature number 605" is attached sequentially and used to specify particular records (signature log entries) from the signature log. In order to know the matching relation between signature and signature log entry, the "signature number 605" of the signature log entry to be added this time to the signature log is added to the formed signature at the time of signature formation.

The "type 606" is the code indicating that the signature log entry 601~603 is produced either at the time of signature formation (transmission) or at the time of signature verification (reception). For example, the signature log entry 601 is understood to have been produced at the time of signature verification (reception) from the type 606.

The "hash value 607 of previous signature log entry" is used to verify the chain of signature log. For example, the "H ($S_1$)" of the "hash value 607 of previous signature log entry" in the signature log entry 602 specified by the signature number "2" is the hash value (hash function is represented by H (X)) of data $S_1$ ($S_1$ has, for example, each values coupled) formed of the values of items 604~609 in the signature log entry 601.

The "hash value 608 of message" may be included in one of the items of the signature log 213. Use of this item will make the interpolation more difficult because it needs the message to which the corresponding signature is affixed.

At the time of signature formation (transmission) on the publication agency's side apparatus, the formed signature is registered in the "signature or received publication signature log entry information 609". For example, a signature "Sign (2 ∥ H ($S_1$) ∥ H ($M_2$))" to the data formed of signature number "2", hash value "H ($S_1$) of previous signature log entry" and hash value of message 608 "H ($M_2$)" is registered in the signature log entry 602. In addition, when the publication agency's side apparatus receives the publication letter of request 506, it registers the data formed of the signature number and hash value of the attached publication signature log entry. For example, the combination "15 ∥ H ($S_{15}$)" is registered in the "signature or received publication signature log entry information 609" of the signature log entry 603 if the signature number of the publication signature log entry affixed to the received publication letter of request 506 and the hash value of publication signature log entry are "15" and "H ($S_{15}$)", respectively.

The user information file 214 is the file in which the publication agency's side apparatus sequentially recorded transaction log entries. In FIG. 6B, each of records 610~616 has a signature number 617, a type 618, trading partner information (called the partner information) 619, a signature number of received signature (called the received signature number) 620, a publication signature log entry 621, and the date and time of time-stamp (called the time-stamp date) 622.

The "signature number 617" corresponding to the signature number 605 of signature log entry is registered in order for the user to know what number the signature log entry was when it was produced and with whom it made a deal.

The "type 618" is the code showing that each of the records 610~616 (transaction log entries) is produced either at the time of signature formation (transmission) or at the time of signature verification (reception) or at the time of newspaper publication 504, or at the time of newspaper publication notice transmission (signature log transmission) 505. For example, the record 613 specified by signature number "3" is found to have been produced at the time of signature verification (reception) from the code in the column of item 618.

The "partner information 619" column has registered therein the information (for example, mail address) about the user who sent a message with signature or about the sender who transmitted the publication letter of request 506. For example, the record 613 specified by signature number "3" is found to be the information of a deal with user B from the address in the column of item 619.

The "signature number of received signature (called received signature number) 620" column has registered therein the signature number of the signature of a message with signature such as the received publication letter of request. For example, the record 613 specified by signature number "3" is found to have been produced when the apparatus received the message with signature of which the signature number is "16".

The "publication signature log entry 621" column has registered therein the publication signature log entry that was affixed in the publication letter of request 506 when it was received. For example, the record 613 specified by signature number "3" is found to have been produced when the apparatus received the publication letter of request with publication signature log entry "$S_{15}$" attached from the code in the column of item 621.

The "date 622" column has registered therein the date and time when the apparatus received (502) the affixed publication signature log entry of the publication letter of request or the date when the signature log entry of the publication agency was published (504) in the newspaper.

The "signature number 617" indicates that, for example, the record 603 specified by signature number "3" of signature log 213 corresponds to the record 613 specified by signature number "3" of user information file 214. The signature log entry 603 is found to have been produced when the publication letter of request was received from user B from each value of the transaction log entry 613. While the publication letter of request has the signature of signature number "16" and publication signature log entry "$S_{15}$" affixed, this publication signature log entry "$S_{15}$" is found to have been received by the publication agency's side apparatus on "Oct. 19, 15:50, 2002".

The user's side apparatus 101~103 also has the user information file 314. The user information file 314 is used for the user to examine the information about the deal with other user and about the deal with the publication agency. The user information file 314 of the user's side apparatus has no portions corresponding to "publication signature log entry" of item 620 and to "date and time" of item 621 unlike the user information file 214 of the publication agency's apparatus. In order for the user to know what number the signature log entry is and with whom it made a deal, the user information file 314 of the user's side apparatus is formed of "signature number" corresponding to the signature number of the signature log entry, "type" that indicates that the corresponding signature log entry was produced either at the time of signature formation (transmission) or at the time of signature verification (reception) or at the time of publication by the publication agency, "information of trading partner (called partner information)", and "signature number of received signature (called received signature number)".

The publication agency's side apparatus uses the publication letter of request receiving program 208 of the publication system to receive the publication letter of request 506 with the publication signature log entry affixed that has been sent from the user.

Figure 7:
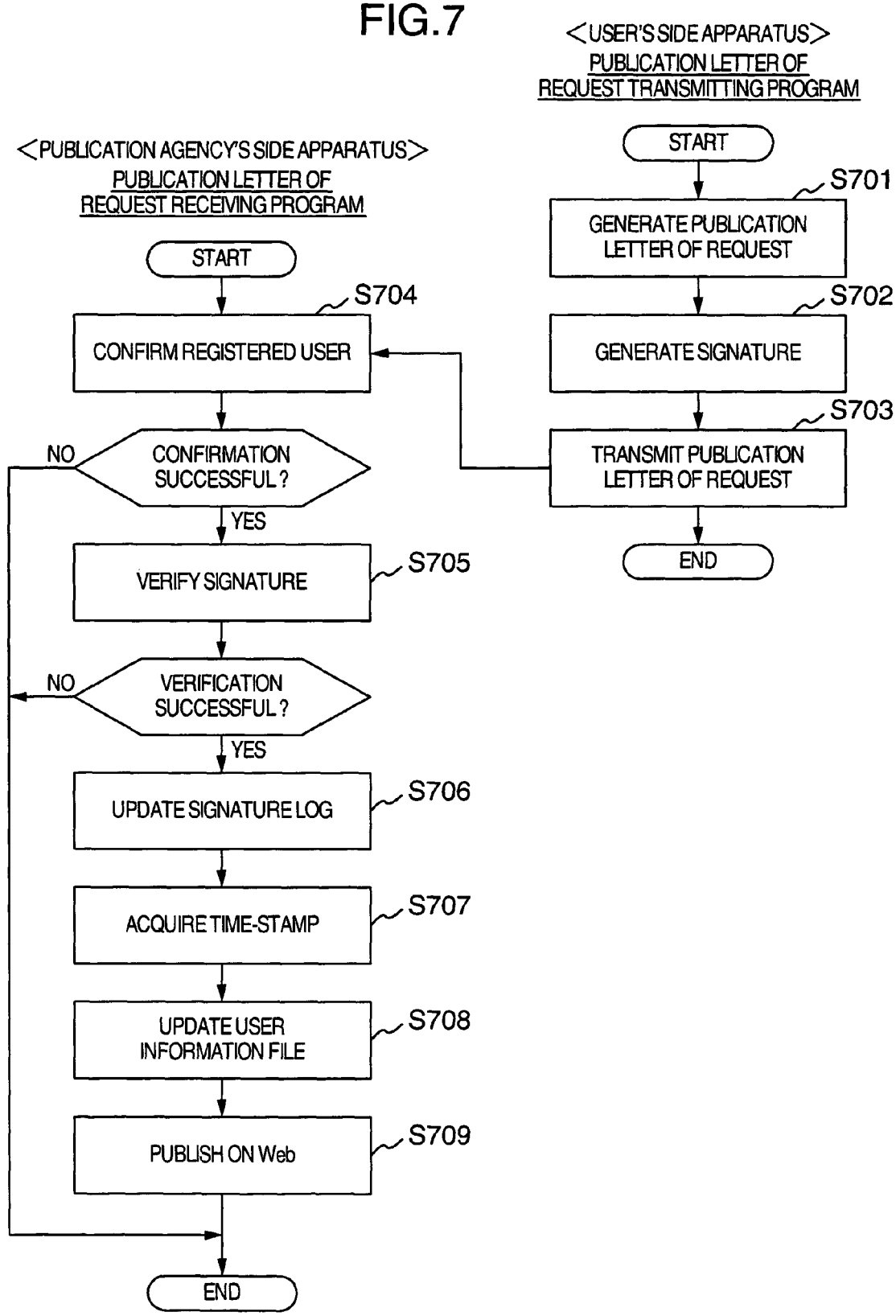
FIG. 7 exemplifies a flowchart to which reference is made in explaining the contents of the receiving program in the publication system.

FIG. 7 is a flowchart of the publication letter of request transmitting program 310 on the user side and the publication letter of request receiving program 208 on the publication agency side.

The user's side apparatus 101~103, in step S701, acquires the information that the user wants to publish (publication signature log entry), and produces the publication letter of request 506 with the publication signature log entry affixed. In step S702, it appends the signature on the publication letter of request produced in step S701, and in step S703 it transmits the publication letter of request with signature to the publication agency's side apparatus.

The publication agency's side apparatus that received the publication letter of request, in step S704, first confirms if the user has been registered in the publication agency, or if the user is a normal publication agency user by use of, for example, a registered database (the list of users registered to use the publication agency). If the signature is affixed to the publication letter of request, the publication agency's side apparatus, in step S705, verifies the signature by use of the public key of the transmitter-side user. The public key may be the public key affixed to the publication letter of request with signature together with the public key certificate or may be acquired from the public key certificate publisher.

After the signature verification, the publication agency's side apparatus, in step S706, uses the publication signature log entry received from the user to produce a signature log entry by, for example, coupling the "identification number 604", "signature number 605", "hash value 607 of previous signature log entry", and "received publication signature log entry information 609", and adds the signature log entry to the signature log 213.

In step S707, it acquires the time-stamp, and in step S708 it records, in the user information file, the "signature number 617" of the signature log entry produced in step S706, "reception code 618" indicating that it has received the publication letter of request, "partner information 619" as the information about the publication letter of request transmitting side user, "signature number of the received signature (if the signature was affixed to the publication letter of request in step S702) 620", received "publication signature log entry 620", and "date and time 621" using the acquired time-stamp. The time-stamp may be acquired from, for example, a time-stamp publishing agency. In addition, as the user information of the transmitting side, the mail address, for instance, may be registered.

In step S703 in FIG. 7, when the user A transmits the publication letter of request with affixed publication signature log entry $S_{31}$ of signature number 31 to the publication agency, the publication agency's side apparatus, in step S706, records another record 601 resulting from coupling the values of items 604~609 of the signature log 213, that is "Ver. 1. 0 (values indicating information such as signature algorithm which the publication agency employs)", "1", "reception", "H ($S_0$) (hash value of the previous signature log entry)", "—(there is no hash value of message since it is the receiving time)", and "31 ∥ H ($S_{31}$)".

In step S708, it further writes record 611 resulting from coupling the values of items 617~622 of user information file 214, that is "1", "reception", userA@XXX.co.jp (mail address of user A), "32 (signature number of the signature affixed to the publication letter of request in step S702)", "$S_{31}$", and "2002. 10. 17. 0816" (date and time on which the publication letter of request was received).

In step S709, it discloses the user name of the publication letter of request transmitting side, and the publication signature log entry affixed to the publication letter of request on the Web.

The publication agency's side apparatus 104 discloses (502), on the Web, the publication signature log entry received from the user by use of the publication letter of request receiving program 208, and then transmits the Web publication notice 507 to the publication signature log entry transmitting side, or the user to notify the user of having disclosed by use of the Web publication notice transmitting program 209.

Figure 8:
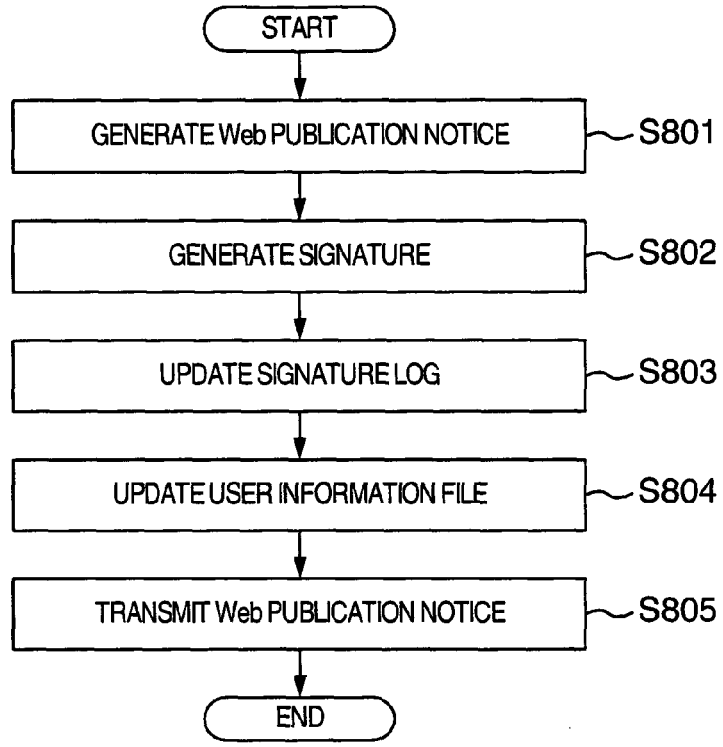
FIG. 8 exemplifies a flowchart to which reference is made in explaining the contents of the transmitting program in the publication system.

The processing flow of the publication notice transmitting program 209 on the publication agency's side apparatus 104 will be described with reference to FIG. 8.

In step S801, it generates the Web publication notice 507 in order to notify the publication letter of request transmitting side user of having disclosed on Web. The Web publication notice may include the publication signature log entry disclosed according to the request from the publication letter of request transmitting user (the signature log entry affixed to the publication letter of request), and the time-stamp acquired in step S707. When these are affixed, the publication agency writes its signature on the Web publication notice, thereby enabling the user who received the Web publication notice to verify when the publication signature log entry was disclosed, and to prove that the signature log entry at least existed before that date.

In step S802, it generates data of a new signature number (corresponding to the addition of 1 to the signature number of the previously produced signature log entry plus 1), the hash value of the previous signature log entry, and the hash value of the Web publication notice produced in step S801 by, for example, coupling, and writes the signature thereon. If the Web publication notice with the record 601 written in the signature log 213 is transmitted to the user A according to the publication notice transmitting program 209, a signature "Sign (2 ∥ H ($S_1$) ∥ H ($M_2$))" is generated from the value "2" resulting from adding 1 to "1" of signature number 605, the hash value 607 "H ($S_1$)" of the previous signature log entry 601, and the hash value of message (here, hash value of Web publication notice) 608 "H ($M_2$)".

In step S803, it adds the information about the signature formed in step S802 to the signature log 213 as a signature log entry. The signature log entry in this case is generated by, for example, coupling the identification number 604 "Ver. 1. 0 (the value indicating the information such as signature algorithm that the publication agency employs)", signature number 605 "2", type 606 "transmission", hash value 607 "H ($S_1$))" of the previous signature log entry, the hash value 608 of message "H ($M_2$) (hash value of Web publication notice)", and signature 609 "Sign (2 ∥ H ($S_1$) ∥ H ($M_2$))". The generated record 602 is newly added to the signature log 213.

In step S804, it records "signature number 617", "type 618", and "partner information 619" in the user information file 214. In the above case, it further writes, in the user information file 214, a record 612 resulting from coupling the signature number "2" of the signature log entry formed in step S803, the transmission code "transmission" showing that the Web publication notice has been sent, and the user information (for example, mail address) "userA@XXX.co.jp (mail address of Web publication notice transmitting user A)" of the Web publication notice transmitting side.

In step S805, it transmits, to the user, the Web publication notice with signature produced in step S802.

As illustrated in FIG. 5, the publication agency makes the latest signature log entry within the signature log of the publication agency be published in the newspaper at an appropriate time or at regular intervals (504). Thus, after the publication, an unalterable signature log entry, or reliable signature log entry can be created within the signature log of the publication agency. The creation of the reliable signature log entry within the signature log of the publication agency can prevent the publication agency itself from fraud, and thus enables the publication agency to earn greater confidence from the user.

Since the signature log in which the chain can be traced from the reliable signature log entries disclosed in the newspaper is allowable or rightful, the user is able to verify the signatures by using the published-on-newspaper signature log entries and signature log of the publication agency and the publication signature log entries and signature log of each user.

Figure 9:
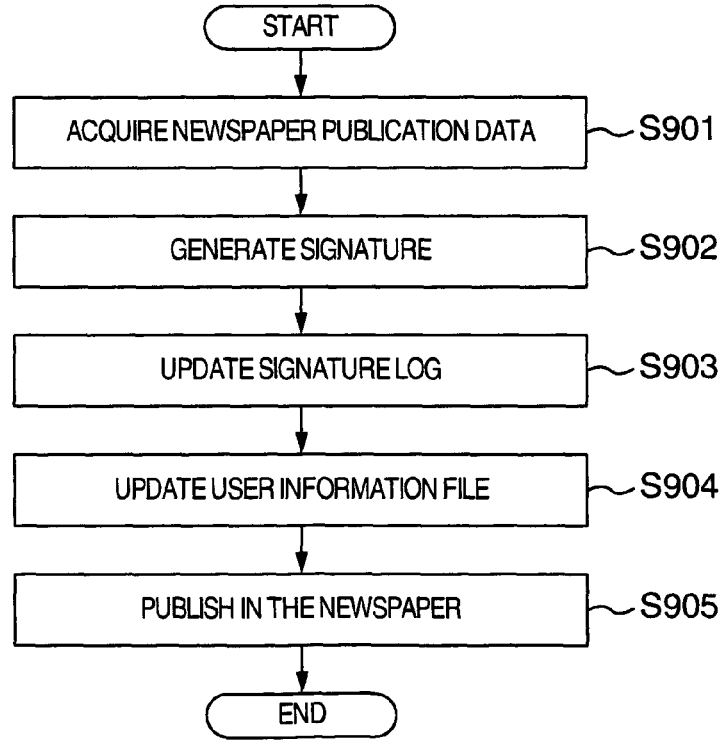
FIG. 9 exemplifies a flowchart to which reference is made in explaining the contents of the newspaper publication program in the publication system.

The processing flow of the newspaper publishing program 210 on the publication agency's side apparatus 104 will be described with reference to FIG. 9.

In step S901, the apparatus acquires data to be disclosed in the newspaper. Specifically, it acquires the latest log entry of the signature log 213. If records 601~603 stay written in the signature log 213, the signature log entry 603, for instance, is to be disclosed in the newspaper (called newspaper publication signature log entry).

In step S902, it produces data of the signature number (that corresponds to the addition of 1 to the signature number of the previously produced signature log entry) of the signature to be formed this time, the hash value of the previous signature log entry, and the hash value of the newspaper publication signature log entry by, for example, coupling, and writes its signature thereon.

In step S903, the information about the signature formed in step S902 is added as a signature log entry to the signature log 213. The signature log entry is produced by coupling "identification number 604", "signature number 605 (signature number of the signature formed this time)", "hash value 607 of the previous signature log entry", "hash value 608 of message (hash value of newspaper publication signature log entry)", and "signature 609 (signature formed in step S902)".

In step S904, the "signature number 617" of the signature log entry produced in step S903, "type 618", "partner information 619", "publication signature log entry 621", and "date and time 622" are written in the user information file 214. In the above case, for example, "newspaper publication code indicating that the publication was made in the newspaper", "information of the place where the publication was made (publication site name)", "newspaper publication signature log entry" and "publication data and time" are written in record 615.

In step S905, the newspaper publication signature log entry is published in the newspaper. At this time, it may be published with the signature of the publication agency or the hash value of the newspaper publication signature log entry may be published.

The publication agency, after the newspaper publication, executes the log transmitting program 211 to transmit the signature log of the publication agency to the user who sent to the publication agency the publication signature log entries during the interval from the previous newspaper publication to this newspaper publication. Thus, each user as well as the publication agency can have the information that can be used to verify the signature log entries by tracing the chain from the newspaper publication signature log entry of the publication agency back to the user's signature log. Even if, for example, the publication agency should go out of existence 10 years later, each user is able to verify.

Figure 10:
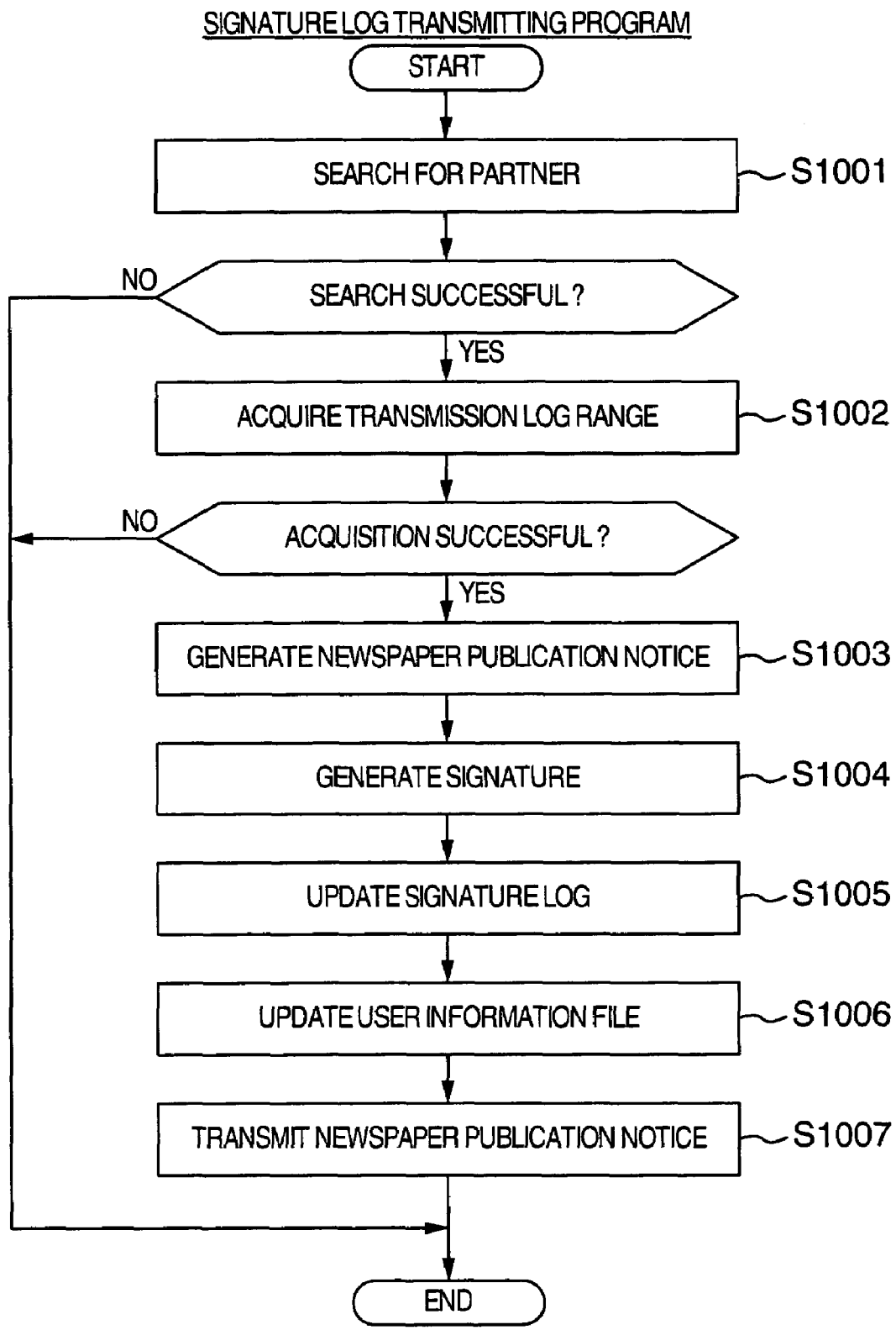
FIG. 10 exemplifies a flowchart to which reference is made in explaining the contents of the log transmitting program in the publication system.

The processing flow of the log transmitting program 211 will be described with reference to FIGS. 6 and 10.

In step S1001, the partner who transmits the signature log is searched for from the user information file 214 on the publication agency. In this case, it specifies the user to which the publication agency sent the Web publication notice during the interval from when the latest newspaper publication signature log entry was published in the newspaper to when the previous newspaper publication signature log entry was published in the newspaper. Specifically, it examines the transaction log entries between the latest transaction log entry (record) with a code attached to the type 618 to show its newspaper publication and the previous transaction log entry with the latest newspaper publication code, searching for the transaction log entry with a transmission code attached to the type 618. The partner information 619 of that transaction log entry is the information about the partner who transmits the signature log.

For example, from the "newspaper" in the column of the type 618 of the user information file 214, it will be understood that the record 615 is the transaction log entry at the time of the latest newspaper publication and that the record 610 is the transaction log entry at the time of the previous newspaper publication. Of the records 611~614, the records at the "transmission" registered in the column of type 618 are records 612 and 614. From the partner information 619 of records 612 and 614, it will be seen that the partners to whom the signature log is to be sent are users A and B.

In step s1002, the range of the signature log that is to be transmitted to the user specified in step S1001 is determined by use of the user information file 214. First, (1) it finds out the signature number of the transaction log entry having recorded therein the signature log partner specified in step S1001, and then (2) it checks the signature number of the latest published-on-newspaper signature log entry. The range of the log to be transmitted is from the signature number of (1) to that of (2). If the user A is specified by record 612 in step S1001 as the partner information item 619 shows the user A and the value of item 617 of record 611 of which the type item 618 shows reception and the value of signature number 617 of record 615 are 1 and 5, respectively.

In step S1003, the newspaper publication notice 508 is produced to be attached with the signature log of the range determined in step S1002 being attached to the notice, and in step S1004, a signature is written to the data that is formed of the signature number of the signature to be formed this time (addition of 1 to the signature number of the previously produced signature log entry), the hash value of the previous signature log entry and the hash value of the newspaper publication notice.

In step S1005, the information about the signature written in step S1004 is added to the signature log 213 as a signature log entry. The signature log entry is produced by coupling the identification number 604, the signature number 605, the hash value 607 of the previous signature log entry, the hash value of message (here, hash value of the newspaper publication notice) 608, and the signature 609 (signature written in step S1003).

In step S1006, the signature number of the signature log entry produced in step S1005, the log transmission code indicating that the newspaper publication notice has been transmitted, the user information (for example, mail address) of the user to which the newspaper publication notice is transmitted are respectively written in the signature number 617, type 618 and partner information 619 of the user information file 214 as, for example, at record 616.

In step S1007, the newspaper publication notice produced in step S1004 is transmitted to the user.

The publication agency's side apparatus 104 manages the users who utilize the publication agency, and the publication signature log entries received from the users by use of the user management program 212. The publication agency's side apparatus registers the users who use the publication agency in its own database by use of the user management program 212. In addition, according to the user's request or publication agency's decision, user information can be added/updated, and users can be deleted.

Since the user requests the publication agency to publish the publication signature log entry, and since the publication agency's side apparatus discloses the user's publication signature log entry according to the publication letter of request receiving program 208 and executes the newspaper publication program 210 to disclose the signature log entry of the signature log 213 in the newspaper, the user can have his or her own signature log that includes the signature log entries with high reliability equivalent to that disclosed in the newspaper.

Figure 11:
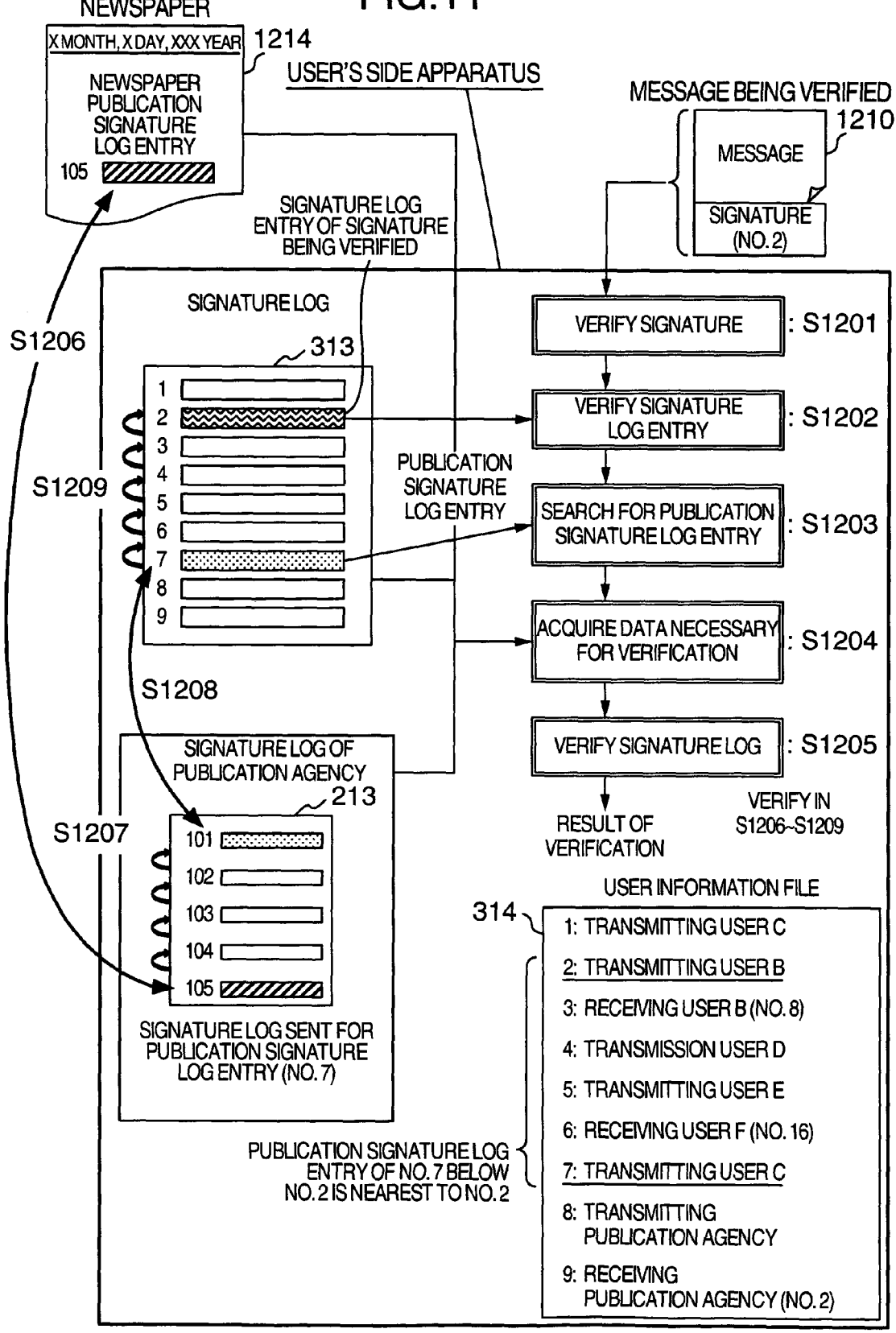
FIG. 11 exemplifies a diagram to which reference is made in explaining a method of user's verifying the signature by use of the signature log entry of the publication agency published in the newspaper or the like, the signature log of the publication agency transmitted from the publication agency in accordance with the signature log transmitting program, the publication signature log entry of each user, and the signature log of each user.

With reference to FIG. 11, a description will be made of examples of the case in which the message verifying program 309 on the user's side apparatus that has the user's signature log and publication agency's signature log useful for the verification is executed to verify the signature of the message being verified.

Referring to FIG. 11, when the user tries to verify a message 1210 with signature of signature number 2 affixed, the program, in step S1201, makes normal signature verification using the public key to the message and signature, and in step S1202, checks if the signature of No. 2 to be verified remains in the item 609 at the signature number 2 of the signature log 313 on the user's side apparatus under examination.

In step S1203, the program searches for the publication signature log entry nearest to the signature of No. 2 below No. 2 of the signature log 313 (in this example, it corresponds to the signature log entry of No. 7). Since the publication signature log entry to be attached to the publication letter of request is the latest signature log entry, if the signature log entry of No. 8 is produced when the publication letter of request is transmitted to the publication agency, the publication signature log entry disclosed at this time will be found to be the signature log entry of No. 7 from the user information file 314. Therefore, the publication signature log entry that is the nearest to No. 2 and below No. 2 is the signature log entry of No. 7. However, if it is below No. 2, it does not necessarily need to be the nearest publication signature log entry.

In step S1204, the program acquires the data necessary for the verification. Here, the data necessary for the verification is the publication agency's signature log 213 of No. 101~No. 105 transmitted from the publication agency's side apparatus in response to the user's request to disclose the publication signature log entry of No. 7 when the signature log 313 in which the signature information of No. 2 remains, the newspaper publication signature log entry 1214 (the publication agency's signature log entry of No. 105 ), and the publication agency's signature log entry of No. 105 are disclosed in the newspaper. The newspaper publication signature log entry must be included in the signature log 213 that is used for the verification. When the newspaper publication signature log entry for the verification is not included in the signature log transmitted from the publication agency's side apparatus, the user who verifies may acquire the necessary publication agency's signature log 213 by requesting.

In step S1205, the program makes chain verification. The chain verification is performed in the following steps.

In step S1206, it is checked to see if the newspaper publication signature log entry (No. 105) 1214 coincides with the signature log entry of No. 105 of the publication agency's signature log 213.

In step S1207, it is checked to see if the chain continues from the publication agency's signature log entry of No. 105 disclosed in the newspaper to the publication agency's signature log entry (signature log entry of No. 101) produced when the user's publication signature of No. 7 is received. At the time of chain verification, the hash value 607 of the previous signature log remaining in the signature log entry compares with the hash value of the previous signature log entry, one entry before. If it coincides, the chain is decided to be continues. If it does not coincide, the chain is decided to the disconnected.

In step S1208, it is checked to see if the content "a combination of the signature number and the hash value of the publication signature log entry (signature log entry of No. 7)", of the "received publication signature log entry information 609" included in the signature log entry of No. 101 of the publication agency's signature log 213 that is produced when the publication letter of request with user's publication signature log entry (signature log entry of No. 7) affixed is produced, is coincident with the content "a combination of the signature number and the hash value of the signature log entry of No. 7" of the item 609 included in the signature log entry of No. 7 of the signature log 313 on the user's side apparatus.

In step S1209, it is checked to see if the chain in the signature log 313 on the user's side apparatus continues from the publication signature log entry (signature log entry of No. 7) to the signature log entry (signature log entry of No. 2) of the signature to be verified. At the time of chain verification, the "hash value 404 of the previous signature log entry" remaining in the signature log entry is compared with the hash value of the signature log entry one entry before. If it coincides, the chain is decided to continue. If it does not coincide, the chain is decided to be disconnected.

If the verification in all the steps of S1206 to S1209 is successful, the chain is successfully verified. If the verification in all the steps of S1201, S1202 and S1205 are successful, the signature to be verified is successfully verified.

As described above, when the signature log entry on the publication agency's side apparatus is disclosed in the newspaper, the publication agency can be prevented from injustice, and thus the validity of the signature can be surely verified. As given below, another method may be used without the publication agency's signature log.

The publication agency's side apparatus couples the publication signature log entries received from a plurality of user's side apparatus during a certain period of time, and takes the hash value thereof. This hash value is disclosed as publication-purpose data by use of media such as newspaper so that the publication agency can be prevented from fraud and that the security of the publication signature log entry that each user requested to publish can be assured. For example, when this publication data is disclosed, another checkout agency employs the user's publication signature log entries disclosed on Web or the like by the publication agency to check if the publication data is correct, thereby proving the validity of the signatures.

Figure 12:
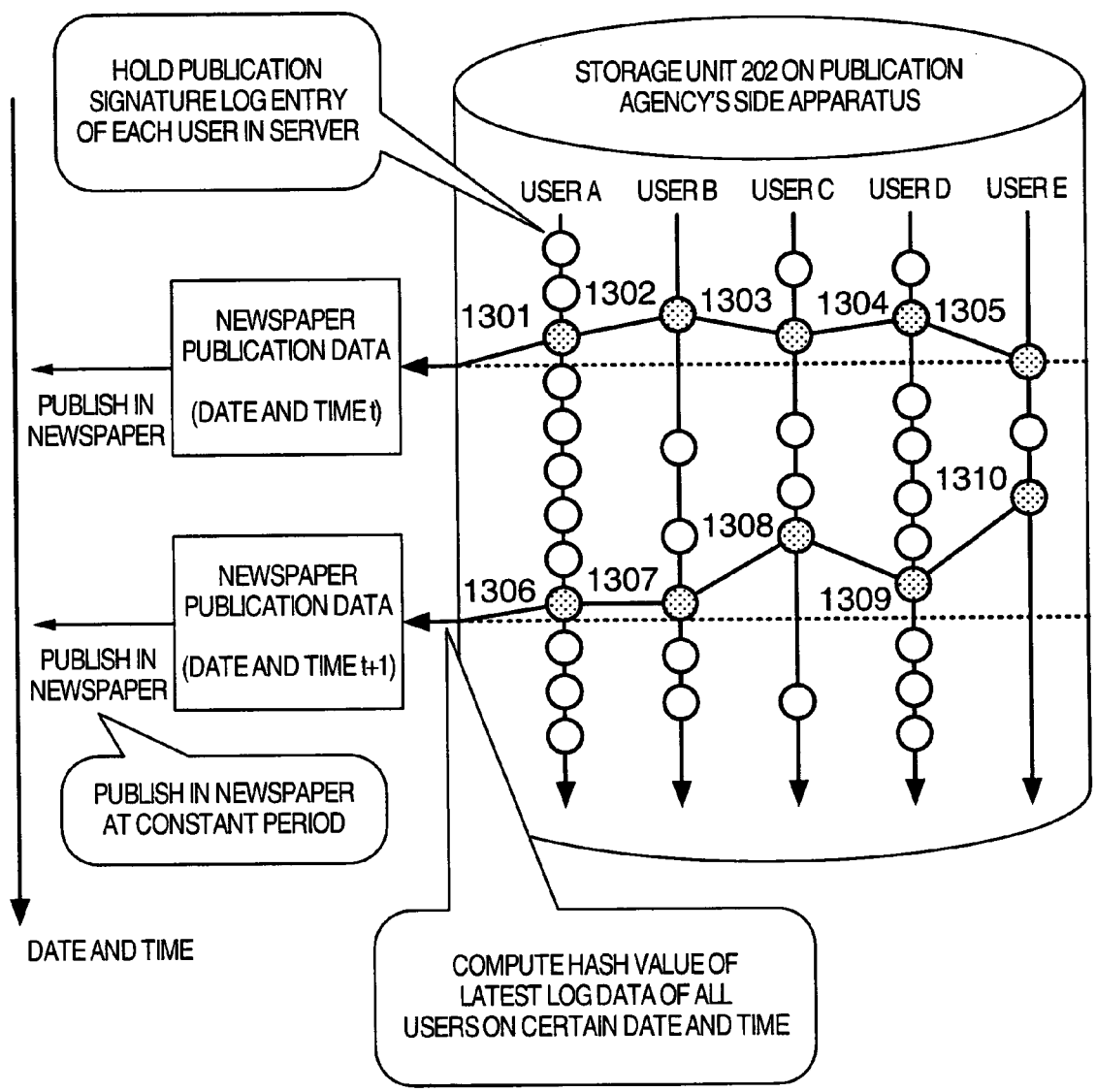
FIG. 12 exemplifies a diagram to which reference is made in explaining a method of producing publication-purpose data by using information received from each user, and publishing in the newspaper.

The specific procedure is as follows. Referring to FIG. 12, the publication signature log entries sent from the user's side apparatus of users A~E are stored in the storage unit 202 of the publication agency's side apparatus 104. The received publication signature log entries are disclosed on Web or the like. When they are published on Web, the publication agency sends the Web publication notice 507 to the users, and at this time the users can know the publication on Web. The publication agency periodically makes newspaper publication 504 by use of the publication signature log entries stored in the storage unit 202. At a date and time t, data of the latest publication signature log entries 1301~1305 that each user requested to publish in the publication agency is produced by, for example, coupling. A hash function is applied to this produced data so that a hash value can be determined, and this hash value is disclosed as newspaper publication-purpose data in the newspaper.

After a certain time has elapsed, or at a date and time t+1, hash values are determined on the basis of the publication signature log entries 1306~1310, and disclosed on the newspaper as newspaper publication-purpose data of date and time t+1.

The above publication data production and disclosure are performed at an appropriate time or at regular intervals, and the newspaper publication notice 508 is transmitted to the user's side apparatus that produced the publication signature log entries used to produce the newspaper publication-purpose data.

Each user's side apparatus compares the disclosed newspaper publication-purpose data with the publication signature log entry published on Web, thereby making it possible to examine if the publication signature log entry is altered dishonestly. If someone tampers even with one of the user's publication signature log entries disclosed, the newspaper publication-purpose data does not coincide with the hash value based on the publication signature log entry disclosed on Web, so that the dishonest alteration is uncovered.

The falseness in the publication agency can be checked out not only on each user's side apparatus but also on another checkout agency's side apparatus though not shown.

We, hereinafter, shows a method of verifying the signature of the user by use of the newspaper publication-purpose data produced on the basis of the data formed of the publication signature log entries that the publication agency's side apparatus 104 received during a certain period of time, and disclosed, and the user's publication signature log entries and signature log. Before the verification, the report from the checkout agency is previously examined to confirm if the Web publication by the publication agency is fraudulent.

Figure 13:
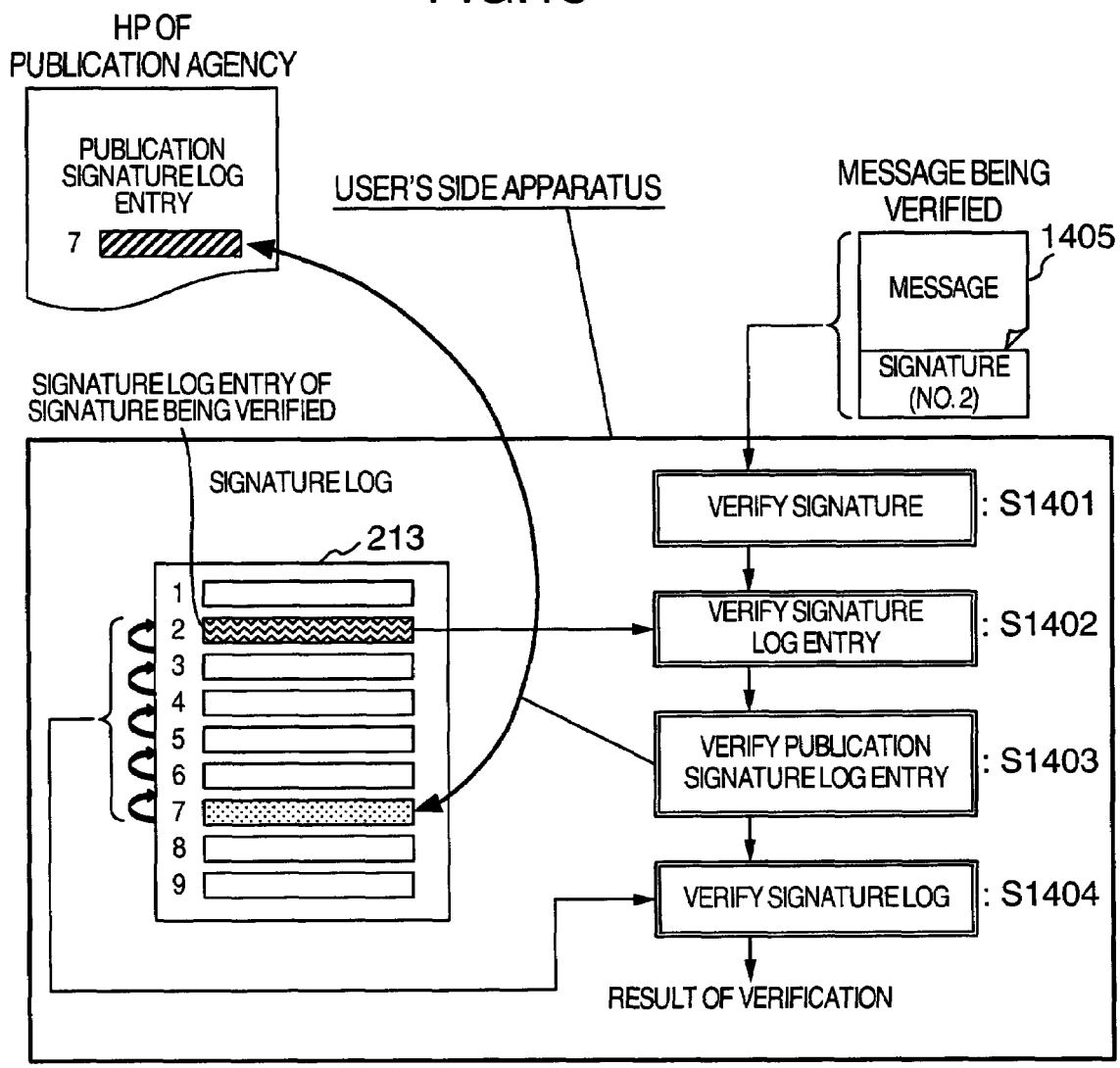
FIG. 13 exemplifies a diagram to which reference is made in explaining a method of user's verifying the signature by use of the publication signature log entry of each user and the signature log of each user when the publication agency couples all the publication signature log entries received during a certain period of time, and discloses the hash value thereof as publication-purpose data in the newspaper.

Let it be considered that a message 1405 with signature of No. 2 is verified as, for example, shown in FIG. 13. In step S1401, normal signature verification is performed to the message and signature to be verified by use of a public key, and in step S1402, it is checked to see if the signature being verified exists within the signature log entry of No. 2 of the signature log 313.

In step S1403, it is checked to see if the publication signature log entry disclosed on Web coincides with the signature log entry of the same signature number (the signature log entry of No. 7 in this example) included in the signature log 313.

In step S1404, it is checked to see if the chain continues from the publication signature log entry (the signature log entry of the same number as the publication signature log entry disclosed on Web) verified in step S1403 to the signature log entry of No. 2 of the signature being verified. The chain verification is performed in the same way as in the above embodiment.

If the verification in all steps S1401~1404 is successful, the signature being verified is successfully verified.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A method of publishing signature log entries having information about signatures generated by a user's side apparatus, wherein the method is implemented on a publication agency's side apparatus, the method comprising:
   receiving user's signature log entries generated by the user's side apparatus and publishing the user's signature log entries;
   notifying users of having published the user's signature log entries;
   when the user's signature log entries have been received, generating a publication agency's signature log entry by using the received user's signature log entries, and updating a signature log having the publication agency's signature log entry previously produced and registered;
   publishing the generated publication agency's signature log entry; and
   notifying the users of having published the publication agency's signature log entry;
   wherein said step of updating the signature log further comprises:
      when the user's signature log entries have been received, generating the publication agency's signature log entry based on the received user's signature log entries and a plurality of other signature log entries, and recording the publication agency's signature log entry in a signature log file; and
      when the user's signature log entries have been received, recording information of the users and information of the received user's signature log entries in a user information file,
   wherein said user information file includes signature numbers and a type indication, and
   wherein the type indication indicates that said user signature log entries have been produced either at the time of transmission, at the time of receptions, or at the time of publication, respectively,
   wherein said step of notifying the users of having published the user's signature log entries further comprises:
      generating a publication notice of the user's signature log entries, so as to notify the users on the user's side apparatus of having published;
      generating a signature from the generated user's signature log entry publication notice and previous signature log entries of the signature log, and adding the signature to the publication notice;
      when the signature has been generated, recording the generated signature in the signature log;
      when transmission to the user is performed, updating information in the user information file, said information including the information of the users, the signature numbers specifying the generated signatures, and a transmission type indicating transmission to the user; and
      transmitting the generated user's signature log entry publication notice to the users;
   wherein said step of notifying the users of having published the publication agency's signature log entry further comprises:
      searching for a partner user by searching for users to whom publication is to be notified from the user information file;
      acquiring a transmission log range by searching for the log to be sent from the user information file;
      generating a publication agency's signature log entry publication notice notifying of having published the publication agency's signature log entry;
      generating a signature from the generated publication agency's signature log entry publication notice and the signature log entries of the previous signatures;
      when the signature is generated, updating the generated signature in the signature log;
      when transmission to the user is performed, updating information to be notified in the user information file, said information including said user information to be notified, said signature number specifying said generated signature, and a transmission type indicating transmission to the user; and transmitting the generated publication agency's signature log entry publication notice to the users;

wherein said step of searching for a partner user further comprises:

searching for the latest user's signature log entry and the previous latest user's signature log entry from among the user's signature log entries included in the user information file, and having a type indicative of having been published; and specifying a transmission partner user from information of the users included in said partner user's signature log entries indicating the type of transmission, from among user's signature log entries included between the searched two user's signature log entries, and wherein said step of acquiring the transmission log range further comprises acquiring as the transmission log range sent to each partner user, signature log entries included between a signature log entry specified by a signature number included in the transmission partner user's signature log entry and a signature log entry specified by a signature number included in the latest user's signature log entry, from the user's signature log entries included between the searched two user's signature log entries.

2. A method according to claim 1, wherein the step of publishing the user's signature log entries further comprises:

acquiring a time-stamp to assure the publication date and time of the user's signature log entry.

3. A method according to claim 1, wherein the step of generating the publication notice of the user's signature log entries further comprises:

generating the publication notice based on a message for notifying the users of having published, the published signature log entries, and the time-stamp indicative of the publication date and time.

4. A method according to claim 1, wherein the step of generating a publication agency's signature log entry further comprises:

generating the signature log entries including signature algorithm identification information, signature numbers attached to the inherent signature log entries, hash values for the previous signature log entries to use in validating the chain, hash values for the signature-generated messages, and the generated signatures, and adds them to the signature log.

5. A method according to claim 1, wherein the step of publishing the generated publication agency's signature log entry further comprises:

publishing part of the signature log updated based on the step of generating a publication notice of the user's signature log entries.

6. A method according to claim 1, wherein the step of generating a publication agency's signature log entry publication notice further comprises:

generating publication notice based on a message for notifying the user of having published the publication agency's signature log entry, the published signature log entry, and the signature log of a range to be transmitted.

7. A method according to claim 1, wherein the step of updating information to be notified in the user information file further comprises:

adding, to the user information file, the information of the signature number attached to the publication agency's signature log entry, the code indicating that the corresponding publication agency's signature log entry was produced when the publication agency's log entry publication has been notified, the partner information indicative of the users to whom the publication notice is to be sent, and the information about a range of log to be transmitted.

8. A method according to claim 1, wherein the user's side apparatus has the user information file that has recorded therein the information about the transmitting-side or receiving-side opponent in association with the user's signature log entries or publication agency's signature log entry transmitted or received by the user's side apparatus.

* * * * *